(12) United States Patent
Scott

(10) Patent No.: US 7,762,529 B1
(45) Date of Patent: Jul. 27, 2010

(54) UNIVERSAL GOOSENECK TRAILER BALL DECOUPLING TOOL

(76) Inventor: Raymond C. Scott, HCR 2 Box 196, Eminence, MO (US) 65466

( * ) Notice: Subject to any disclaimer, the term of this patent is extended or adjusted under 35 U.S.C. 154(b) by 712 days.

(21) Appl. No.: 11/710,293

(22) Filed: Feb. 23, 2007

(51) Int. Cl.
*B66F 15/00* (2006.01)
*B66F 11/00* (2006.01)

(52) U.S. Cl. .................... 254/120; 254/131; 280/441.2; 280/512; 280/513

(58) Field of Classification Search ................. 254/120, 254/131, 131.5; 280/441.2, 478.1, 479.2, 280/512, 513, 485
See application file for complete search history.

(56) References Cited

U.S. PATENT DOCUMENTS

| | | | | |
|---|---|---|---|---|
| 2,099,592 A | * | 11/1937 | Barton | 254/132 |
| 2,832,628 A | * | 4/1958 | Turnbull | 294/17 |
| 3,985,338 A | * | 10/1976 | Herrmann | 254/131 |
| 4,488,706 A | * | 12/1984 | Kono | 254/131 |
| 5,240,270 A | | 8/1993 | Colibert | |
| 5,263,735 A | * | 11/1993 | Mann | 280/512 |
| 5,382,109 A | | 1/1995 | Nyman | |
| 5,385,363 A | | 1/1995 | Morey | |
| 5,462,385 A | * | 10/1995 | Mohlengraft | 404/25 |
| 5,683,094 A | * | 11/1997 | Gullickson | 280/485 |
| 5,868,415 A | | 2/1999 | Van Vleet | |
| 5,904,342 A | * | 5/1999 | Laarman | 254/419 |
| 6,024,372 A1 | | 2/2002 | Colibert et al. | |
| 6,464,241 B1 | * | 10/2002 | Daniel | 280/512 |
| 6,540,246 B2 | | 4/2003 | Anderson et al. | |
| 6,808,195 B2 | * | 10/2004 | Smith | 280/417.1 |
| 6,964,407 B1 | * | 11/2005 | Butler | 254/131 |
| 7,097,193 B1 | * | 8/2006 | Sievert | 280/441.2 |
| 7,226,036 B1 | * | 6/2007 | Wellman, Jr. | 254/15 |

\* cited by examiner

*Primary Examiner*—Lee D Wilson
(74) *Attorney, Agent, or Firm*—Richard L. Marsh

(57) ABSTRACT

An universal tool for unlatching a locking pin on a gooseneck ball hitch comprises an arm supported on a support leg.

8 Claims, 3 Drawing Sheets

UNIVERSAL GOOSENECK TRAILER BALL DECOUPLING TOOL

BACKGROUND OF THE INVENTION

1. Field of the Invention

This invention relates to a tool for unlatching a locking pin on a gooseneck ball hitch.

2. Prior Art Statement

The gooseneck trailer has been a boon to farmers, freight haulers, construction firms and individuals. Though some gooseneck trailers are fitted with a fifth-wheel connection requiring a fifth-wheel plate installation in the towing vehicle, ball hitch gooseneck trailers are the preferred device for multiple use vehicles. The ball hitch is coupled to a ball which is generally disposed over the drive axle of the towing vehicle, however, the ball hitch is also generally disposed in the bed of a pickup or small truck which requires the operator to bend underneath the overhang of the gooseneck, crawl into the bed of the truck, lift and move the latch pin from a locked position to an unlocked position. Typical gooseneck ball hitches are described in U.S. Pat. No. 5,263,735 issued on 23 Nov. 1993 to Fred W. Mann, U.S. Pat. No. 5,382,109 issued on 17 Jan. 1995 to Oscar W. Nyman, U.S. Pat. No. 5,683,094 issued on 4 Nov. 1997 to Russell C. Gullickson and U.S. Pat. No. 6,464,241 issued on 15 Oct. 2002 to Jeffrey Daniel. These patents show a locking pin handle which has a pin releasably associated with a hole or slot in the locking plates. All require the operator to enter the bed of the vehicle to unlock the trailer ball and therefore, there is a great need for a simple, inexpensive tool that can be carried in a tool box or placed loosely in the bed of a towing vehicle which can be manually operated from any of various positions adjacent the bed of the towing vehicle to unlock a locking pin from a gooseneck trailer ball hitch and place the locking pin in upon an unlocking position post.

It is known to provide a remote release for a gooseneck ball hitch which has a spring loaded pin protected by an enclosure on the side of the gooseneck. The remote release has a quarter-turn lock handle positioned on the gooseneck adjacent the jack handle to hold the locking pin out of the hole until putting the column of the gooseneck onto the ball. The bottom plate of the ball hitch has a cone on the bottom of the plate to receive the ball which moves the bottom plate relative to the ball plate. The bottom plate is spring loaded to the locked position so that when the ball passes through the holes in both plates, the bottom plate rotates to the locked position to secure the gooseneck to the ball. The operator must then unlock the quarter-turn lock handle and allow the spring loaded pin to drop into the locking aperture through both plates. For instance, see the U.S. Pat. No. 5,385,363 issued on 31 Jan. 1995, to James A. Morey. The device must be installed on the gooseneck of the trailer requiring considerable cost both for the device and its installation. There is a great need for a simple, inexpensive tool which can be manually manipulated into position to unlock the locking pin and place it on an unlocking post.

It is also known to provide an adapter for a fifth-wheel king pin which has a plurality of balls disposed in a ring surrounding a central post wherein the balls fall out of engagement with holes in the post when the ring is rotated. A rod is fitted in a slot having detents at opposed ends of the slot, one end of the rod affixed in the ring. For instance, see the U.S. Pat. No. 6,808,195 B2 issued on 26 Oct. 2004 to Jerry R. Smith. There is a need for a simple, inexpensive tool for unlatching a locking pin on a gooseneck ball hitch which comprises an arm supported on a support leg wherein the tool can be manually manipulated into position to unlock the locking pin.

It is further known to provide an adapter which converts a fifth-wheel to a ball hitch that has a remote latch for a gooseneck ball hitch which has a conical lower surface, however, this latch moves a hardened steel forward pin from a position underneath the ball. For instance, see U.S. Pat. No. 6,540,246 B2 issued on 1 Apr. 2003 to Anderson, et al. Though effective, there is still a need for a simple, inexpensive tool which can be manually manipulated into position to unlock the locking pin.

Additionally, it is known to provide a locking device having a locking plate that pivots about a pin into the reduced neck of the ball shank, the pin comprising a spring loaded eye that when grasped, is used to both unlock the pin and rotate the locking plate. When unlocked, the pin is then inserted into an unlock hole. For instance, see U.S. Pat. No. 5,868,415 issued on 9 Feb. 1999 to Robert D. VanVleet. It is still required to enter the bed of the towing vehicle to manually rotate the locking plate, a short coming of most gooseneck ball hitches. Thus, there is still a need for a simple, inexpensive tool which can be manually manipulated into position, the tool having an arm supported on a support leg wherein the locking pin engagement end of the arm terminates in a curved hook.

Finally, it is known to provide a latch and a coupler jaw for a gooseneck trailer ball hitch which are separately cable operated to decouple the gooseneck from the ball. For instance, see the U.S. Pat. No. 5,240,270 issued on 31 Aug. 1993 to Floyd Colibert or the U.S. Pat. No. 6,024,372 issued on 15 Feb. 2000 to Colibert, et al. The cables may easily be tangled which may result in inadvertent tripping of the latch and potential subsequent unlatching of the coupler jaw. The need for a simple, inexpensive tool that is detachable from the lock but may still be used to trip the latch and the coupler jaw of this invention is still needed.

SUMMARY OF THE INVENTION

Though there are several permanently affixed, remotely operated latch pin releases available on the market, these latch pin releases are expensive to acquire, install and maintain. Therefore, there is a great need for a simple tool that can be carried in a tool box or placed loosely in the bed of a towing vehicle which can be manually operated from any of various positions adjacent the bed of the towing vehicle to unlock a locking pin from a gooseneck trailer ball hitch and place the locking pin in upon an unlocking position post. Therefore, it is an object of this invention is to provide a tool for unlatching a locking pin on a gooseneck ball hitch which comprises an arm supported on a support leg.

A primary goal of this invention is to provide a tool having an arm supported on a support leg wherein the arm has a handle end and a locking pin engagement end, the locking pin engagement end opposite the handle end.

A significant feature of this invention is to provide a tool comprising an arm supported on a support leg wherein the arm has at least one journal plate disposed on at least one side thereof.

A primary aspect of this invention is to provide a tool comprising an arm supported on a support leg wherein the arm has a curve disposed between a handle end and a locking pin engagement end.

A main purpose of this invention is to provide a tool comprising an arm supported on a support leg, the arm having at least one journal plate disposed on at least one side of the arm between a curve of the arm and a locking pin engagement end.

A primary principle of this invention is to provide a tool comprising an arm supported on a support leg, the support leg having a proximal end and a distal end, the proximal end of the support leg journaled on at least one journal plate.

A principal aim of this invention is to provide a tool comprising an arm supported on a support leg wherein the support leg has a foot on the distal end and wherein a plane passing through the central axis of the arm is substantially centrally disposed over the foot. The support leg may be offset with respect to the foot or the support leg is straight from a proximal end to the distal end wherein an axis of the support leg is aligned with the central axis of the arm.

Alternately, the foot may be spherical.

Another goal of this invention is to provide a tool comprising an arm supported on a support leg wherein a locking pin engagement end of the arm terminates in a curved hook.

Another aim of this invention is to provide a tool comprising an arm supported on a support leg wherein the arm is substantially straight between a handle end and a locking pin engagement end.

Still another purpose of this invention is to provide a tool comprising an arm supported on a support leg wherein the support leg is journaled directly on the arm.

Another aspect of this invention is to provide a tool for unlatching a locking pin on a gooseneck ball hitch which comprises an arm received in and supported in a saddle on a proximal end of a support leg.

Another principle of this invention is to provide a tool which comprises an arm received in and supported in a saddle on a proximal end of a support leg wherein the saddle has journal holes disposed through opposed sides of the saddle and wherein the arm is journaled on a journal pin passing through and secured in the journal holes. The support leg preferably has a foot on a distal end opposite the proximal end and the support leg has the saddle located substantially centrally over the foot.

Another object of this invention is to provide a tool for unlatching a locking pin on a gooseneck ball hitch comprises an arm rigidly affixed to a support leg, the support leg having a foot on a distal end thereof, the foot provided with an anti-slippage surface on at least a portion of the exterior surface thereof.

Finally, it is an object of this invention is to provide a tool for unlatching a locking pin on a gooseneck ball hitch comprises an arm rigidly affixed to a support leg.

BRIEF DESCRIPTION OF THE DRAWINGS

FIG. 1 additionally shows an alternate configuration for the arm of the tool.

DESCRIPTION OF THE PREFERRED EMBODIMENTS

While the various features of this invention are hereinafter described and illustrated as a tool for unlatching a locking pin on a gooseneck ball hitch comprises an arm supported on a support leg, it is to be understood that the various features of this invention can be used singly or in various combinations thereof for a tool for unlatching a locking pin on a gooseneck ball hitch as can hereinafter be appreciated from a reading of the following description.

Figure 1:
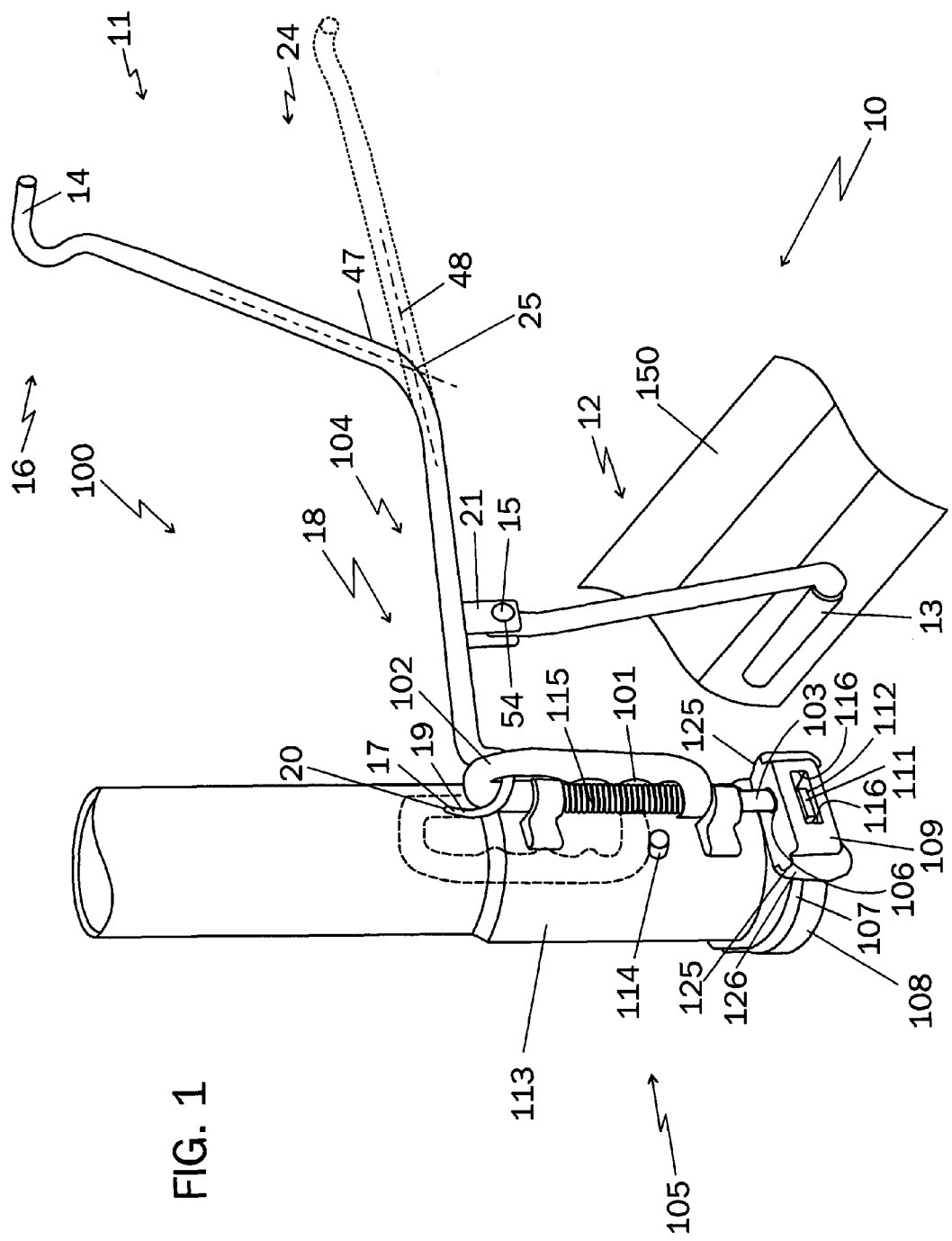
FIG. 1 is a frontal perspective view of a gooseneck ball hitch column showing a "D" handle of a locking pin in a pinned position in solid lines and an unlocked position in phantom lines, the "D" handle in phantom resting on an unlocked post, a hook on one end of an arm of the tool of this invention shown engaged with the "D" handle and the foot of the tool resting upon a support surface such as a truck bed.
Figure 2:
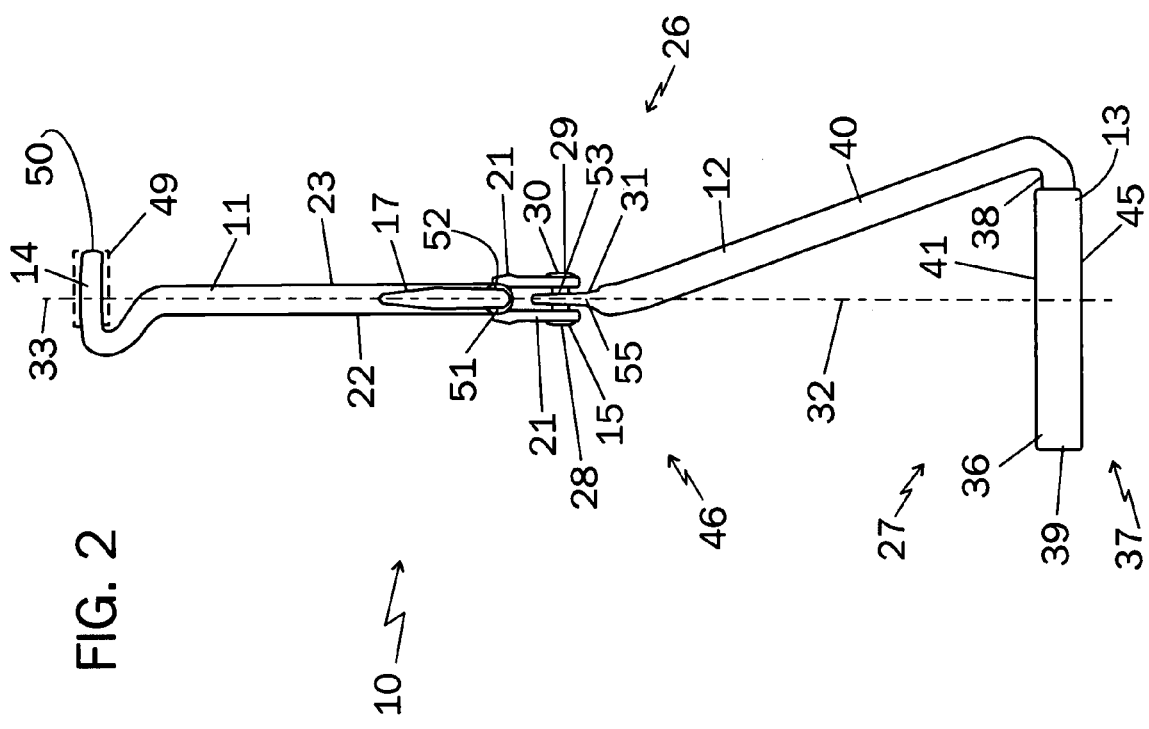
FIG. 2 is an end plan view of the preferred embodiment of the tool for unlatching a locking pin on a gooseneck ball hitch of this invention showing the preferred alignment of a hook for the locking pin centrally disposed over a foot of the tool and centrally disposed in a handle of the arm of the tool.

Referring now to FIGS. 1 and 2, a tool for unlatching a gooseneck ball hitch 100 from a ball affixed to a towing vehicle is generally shown by the numeral 10 and comprises an arm 11 supported on a support leg 12. Arm 11 has a handle 14 on a handle end 16 and a locking pin engaging protuberance 17 on a locking pin engagement end 18, locking pin engagement end 18 disposed substantially opposite handle end 16. Protuberance 17 may be selected from the group consisting of hook, saddle, claw, cusp or combinations thereof, protuberance 17 preferably comprising a curved hook 19 tapering to a point 20. Protuberance 17 is adapted to be engaged with locking pin 103 of gooseneck ball hitch 100 such as in a closed loop 101 of a "D" handle 102 shown in the aforementioned U.S. Pat. Nos. 6,464,241 B1, 5,382,109 or FIG. 8 of 5,263,735, though protuberance 17 of tool 10 may be engaged in an eye loop of certain gooseneck ball hitches 100 such as shown in the aforementioned U.S. Pat. No. 5,683,094 or under a trip lever of certain other gooseneck ball hitches 100 such as shown FIGS. 1,4 & 5 in the aforementioned U.S. Pat. No. 5,263,735. The following description is generally directed toward use of tool 10 with an unbiased gooseneck ball hitch 100 similar to U.S. Pat. No. 5,382,109 or U.S. Pat. No. 5,263,735, however, other uses for tool 10 will become readily apparent from a close reading and understanding of this specification. When engaged in closed loop 101 of "D" handle 102, tool 10 is used to lift locking pin 103 from a locked position 104 shown in solid lines in FIG. 1, locking pin 103 lifted clear of a hole 106 disposed through a boss 109 of a base 108 of gooseneck ball hitch 100 and clear of a hole, not shown, in a tab 111 of a ball locking plate 107, base 108 movable relative to locking plate 107. "D" handle 102 is biased into a locked coupling position 104 by a spring 115 around a shaft terminating in locking pin 103 and thus "D" handle provides considerable resistance to lifting in order that locking pin 103 retain base 108 and locking plate 107 in locked position 104 when gooseneck ball hitch 100 is coupled to a ball of a towing vehicle. Hence, it is necessary for protuberance 17 to positively engage "D" handle 102 in order to ensure that locking pin 103 is lifted clear of hole 106 and placed upon a post 114 when uncoupling gooseneck ball hitch 100 from a ball of a towing vehicle. Tab 111 of ball locking plate 107 protrudes into boss 109 and thus prevents base plate 108 and boss 109 from rotating more than a few degrees relative to locking plate 107, tab 111 limited in movement by the terminal edges 116 of slot 112 in boss 109. Once lifted clear of hole 106, locking pin 103 is rotated about an axis thereof inwardly toward a column 113 of gooseneck ball hitch 100 and rested in the raised position upon post 114 provided on column 113. "D" handle 102 is shown in an unlocked position 105 in dashed lines in FIG. 1 with "D" handle 102 resting upon post 114 and protuberance 17 of tool 10 disengaged therefrom. Upon resting locking pin 103 on post 114, or in another unlocked position 105 of certain gooseneck ball hitches 100, tool 10 may then be disengaged from closed loop 101 and used to rotate base plate 108 to an open position where base plate 108 is no longer engaged under the ball. Since tool 10 may be laid over either way into a horizontal position, point 20 may also be used to assist with moving base plate 108 to an unlocked position when uncoupling column 113 from the ball, however, since the underside of the ball is rounded, locking plate 107 usually moves to an unlocked position upon raising column 113 from the ball. It should be apparent that though it is known that the ball is rounded and the underside of base plate 108 tapered inwardly, the ball may not move base plate 108 into an uncoupled position when column 113 of gooseneck ball hitch 100 is placed thereupon and therefore, the ball hole in base plate 108 is preferably aligned with a ball hole in locking plate 107 prior to attempting to coupling column 113 to the ball by using point 20 of tool 10 to align the ball holes prior to coupling. In this instance, protuberance 17 is inserted in slot 112, engaged against an edge 116 in boss 109 and drawn toward the operator by handle 14 to move base 108 relative to locking plate 107. Then, upon coupling gooseneck ball hitch 100 to the ball on the towing vehicle, protuberance 17 is insertable through slot 112 and is engaged against edge 116 in base plate 108 to move base plate 108 into a locked position prior to engaging locking pin 103 into locking hole 106. To complete coupling gooseneck ball hitch 100 to a ball on a towing vehicle, protuberance 17 of tool 10 is again engaged with "D" handle 102, "D" handle 102 lifted free of post 114 and lowered to allow locking pin 103 to be engaged in locking hole 106 in base plate 108 and through the hidden hole in locking plate 107. It is also possible to have base plate 108 displaced from a locked coupling position 104 wherein the locking hole in base plate 108 and locking hole in locking plate 107 are aligned and then have "D" handle 102 released from post 114 thus allowing locking pin 103 to rest upon base plate 108. Gooseneck ball hitch 100 can then be lowered upon the ball, base plate 108 moved with tool 10 into a coupled position thus allowing locking pin 103 to drop when aligned with locking hole 106 of boss 109 and be fully engaged therein and in the hidden locking pin hole in locking plate 107. Protuberance 17 of tool 10 may also move base plate 108 of gooseneck ball hitch 100 by hooking point 20 of protuberance 17 against a nub 125 provided on the side edge 126 of boss 109 as base plate 108 generally moves easily when locking pin 103 is removed from hole 106. It should be readily recognized that in the aforementioned U.S. Pat. No. 5,263,735, tool 10 is used to lift the lifting handle thereof sufficiently to rest the lifting handle upon the raised cam, be removed from engagement with the handle. Protuberance 17 is then inserted into the slot reserved for the locking pin of the lifting handle and used to rotate base plate 108 to a fully unlocked position. Of course, reversing this process allows the coupling and locking of gooseneck ball hitch 100 of the aforementioned U.S. Pat. No. 5,263,735 to a towing vehicle. When used with a gooseneck ball hitch 100 which has a biased locking plate 107 as shown in the aforementioned U.S. Pat. No. 6,464,241 B1, the bottom surface of locking plate 107 is usually tapered which allows movement of locking plate 107 into alignment with a ball hole in base plate 108 during the coupling process, locking plate 107 biased into engagement with the underside of the ball upon fully seating the ball in gooseneck ball hitch 100. "D" handle 102 is then lifted free of post 114 and rotated to locked coupling position 104 allowing locking pin 103 to be engaged in hole 106 of boss 109 and the hidden locking pin hole in locking plate 107.

In order for tool 10 to be easily used to unlock locking pin 103 from locked position 104, arm 11 is preferably supported above a support surface 150, such as a bed of the towing vehicle, upon support leg 12 and thus arm 11 preferably has at least one journal plate 21 disposed on at least one side 22 thereof and most preferably has journal plate 21 disposed on both sides 22, 23 of arm 11. Arm 11 of tool 10 also preferably has a curve 24 disposed between handle end 16 and locking pin engagement end 18, however, arm 11 may be straight as shown in dashed lines in FIG. 1. Arm 11, when straight, is best used with towing vehicles having an elevated bed such as flat bed light trucks. In the preferred embodiment, curve 24 allows an operator to stand erect at a side edge of the towing vehicle such as a pickup and manipulate locking pin 103. Journal plate 21 is disposed on at least one side 22 of arm 11 preferably between curve 24 and locking pin engagement end 18 and most preferably about two-thirds of the distance from an intersection point 25 of the portions of curve 24 to locking pin engagement end 18. Support leg 12 has a proximal end 26 and a distal end 27, proximal end 26 of support leg 12 journaled on a journal pin 15 affixed to at least one journal plate 21. Journal plates 21 receive proximal end 26 therebetween, proximal end 26 provided with journal pin receiving hole 53 receiving journal pin 15 therethrough. Journal pin 15 has a head 28 bearing against one journal plate 21 and has closure portion 30 on an end 29 opposite head 28, closure portion 30 bearing against an opposed journal plate 21 where both journal plates 21 are utilized or bearing against an outside surface 31 of proximal end 26 of support leg 12 when only one journal plate 21 is used as in dotted lines in FIG. 3. It should be appreciated here, that the clearance between the upper surfaces of the pickup box rails and the underside of the gooseneck trailer may be as little as eight inches providing limited access to gooseneck trailer hitch 100. Thus, curve 24 is provided on arm 11 to allow tool 10 to also be used in vehicles having dual drive wheels on each end of an axle, curve 24 allowing arm 11 to be moved downwardly without arm 11 interfering with a wheel well positioned over the dual drive wheels yet providing sufficient movement to unlock "D" handle 102 from locked coupling position 104.

Support leg 12 of tool 10 preferably has a foot 13 disposed on distal end 27, foot 13 preferably disposed at a right angle to a plane 32 passing through a central axis 33 of arm 11. Support leg 12 has an offset portion 40 and a lateral portion 41, lateral portion 41 comprising foot 13. In the preferred embodiment, foot 13 is disposed at an acute angle with respect to support leg 12 thus establishing offset portion 40. Offset portion 40 of support leg 12 is offset with respect to foot 13 such that plane 32 is substantially centrally disposed over foot 13 thus effectively balancing arm 11 on support leg 12. It should be readily apparent that though it is preferable that arm 11 be in a balanced position upon support leg 12, tool 10 may have support leg 12 offset to a greater or lesser degree with respect to plane 32 and still function as intended. It should also be readily apparent that an offset in support leg 12 may be omitted and thus support leg 12' is straight from proximal end 26 to distal end 27 wherein an axis 34 of support leg 12' is aligned with central axis 33 of arm 11 and foot 13 has a spherical terminus 35, straight support leg 12' with spherical terminus 35 shown in long dashed lines in FIG. 3. In the preferred embodiment, foot 13 preferably has anti-slippage surface 36 on at least a portion 37 of an exterior surface 38 thereof, anti-slippage surface 36 may readily be accomplished by force fitting a rubber tube over a terminal end 39 of foot 13. Other methods of providing anti-slippage surface 36 on foot 13 may be used without departing from the scope of this invention. In the alternate embodiment of FIG. 3, spherical terminus 35 may be provided with anti-slippage surface 36 by coating spherical terminus 35 in a rubber substance or by knurling spherical terminus 35.

When used with the gooseneck trailer hitch 100 of U.S. Pat. No. 6,464,241 B1, protuberance 17 of is inserted into closed loop 101 of gooseneck ball hitch 100 but tool 10 is used only to lift "D" handle 102 free of locking pin hole 106 in boss 109 and rest "D" handle 102 upon post 114 as base plate 108 is biased into coupled position 104 by an internal spring as fully set forth in the description thereof. "D" handle 102 is then preferably retained against post 114 until coupling of gooseneck trailer ball hitch 100 to a towing vehicle is desired, though it is permissible to rotate "D" handle 102 from post 114 when gooseneck ball hitch 100 of this patent not coupled to a towing vehicle. Then, when coupling of gooseneck ball hitch 100 to a towing vehicle is desired, upon lowering gooseneck trailer ball hitch 100 over the ball on the towing vehicle, base plate 108 moves against the biasing spring into a coupling position thus aligning the ball opening apertures allowing the ball to penetrate into the column. Since base plate 108 is biased into a coupling position, base plate 108 rotates into coupling position 104 upon full seating of the ball and thereafter tool 10 is used to release "D" handle 102 from post 114 thus locking base plate 108 to ball locking plate 107.

Figure 4:
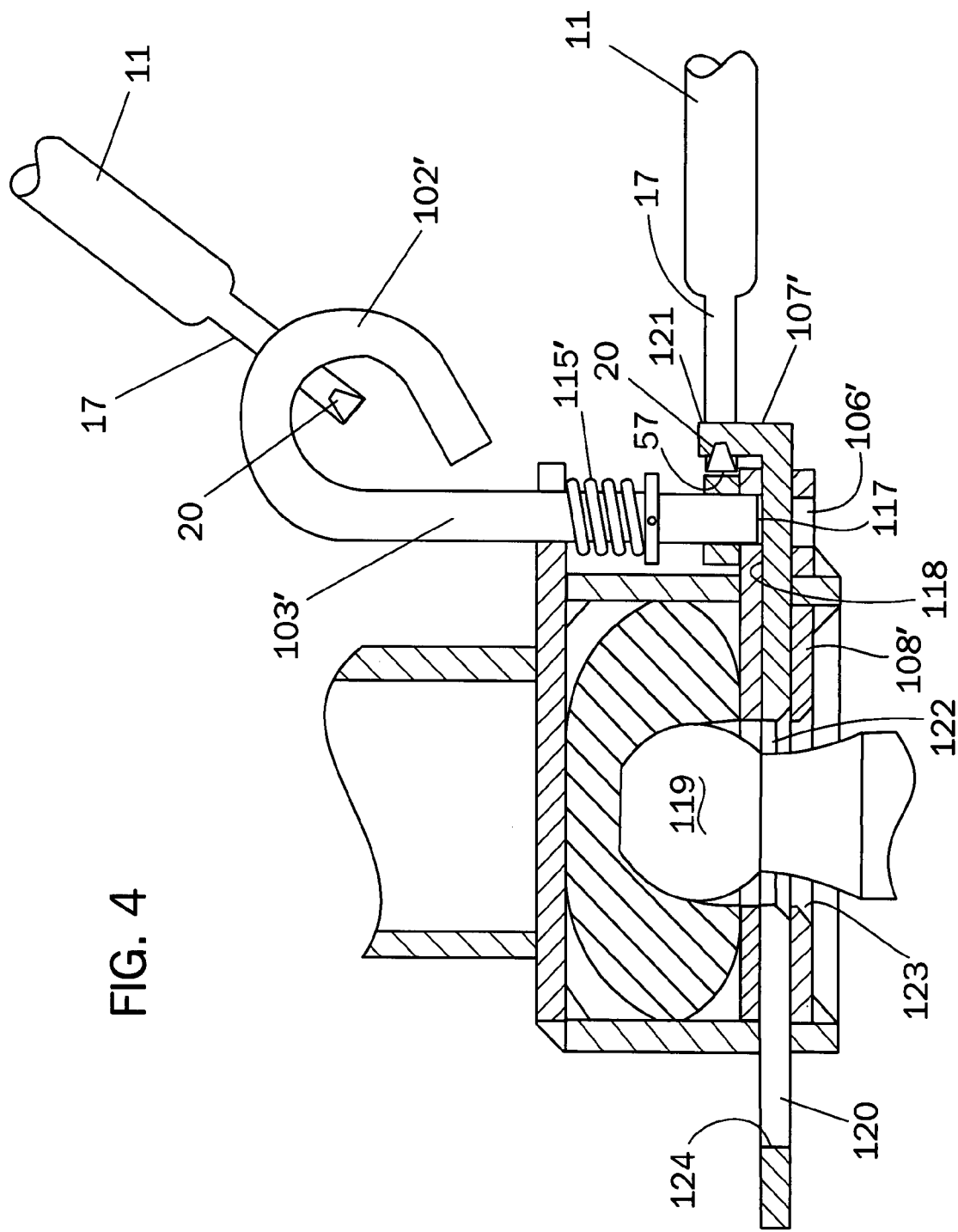
FIG. 4 is a side plan view of the use of the tool of this invention with an alternate gooseneck hitch ball.

Referring now to FIG. 4, it is observed that tool 10 of this invention is usable to lock gooseneck ball hitch 100 of U.S. Pat. No. 5,683,094 to a towing vehicle by engaging an upright tab 121 of locking plate 107' and moving locking plate 107' to the right thus drawing a slot 120 in locking plate 107' underneath the ball 119. When locking plate 107' is moved to a locking position, locking pin 103' drops through the ball receiving hole 122 which has been moved in alignment with locking pin holes 106' thus locking plate 107' to base plate 108'. Gooseneck ball hitch 100 of U.S. Pat. No. 5,683,094 may be unlocked by lifting the eye loop, designated as 102', from locking holes 106' provided through fixed base plate 108' and a ball hitch hole 122 disposed through locking plate 107', eye loop 102' raised sufficiently to clear locking plate 107'. As gooseneck ball hitch 100 is raised from a ball engaging position, locking plate 107' moves slightly left as end 124 of slot 120 rides upwardly along the rounded surface of ball 119 and a terminal end 117 of locking pin 103' is then rested upon an upper surface 118 of locking plate 107 by lowering locking pin 103' with tool 10. Once disengaged from locking pin 103', flat end 57 of protuberance 17 of tool 10 is then used to push locking plate 107' to a fully disengaged position as shown in FIG. 4, where ball hitch hole 122 in locking plate 107' aligns with a fixed ball receiving hole 123 disposed through base plate 108'. When coupling gooseneck ball hitch 100 of U.S. Pat. No. 5,683,094, gooseneck ball hitch 100 is lowered onto ball 119 and tool 10 is used to draw locking plate 107' such that end 124 of slot 120 is engaged under ball 119 wherein locking pin 103' is forced through ball receiving hole 122 in locking plate 103' and into hole 106' in the bottom portion of base plate 108' by the force of biasing spring 115'. Tool 10 is then disengaged from upright tab 121 and stored for later use.

Leg 12 of the preferred embodiment of tool 10 will rotate toward either handle end 16 with foot 13 lying against peripheral portion 47 of curve 24, or toward locking pin engagement end 18 with foot 13 extending beyond flat end 57 of protuberance 17. Thus, it can be readily observed that tool 10 may be stored in a compartment in a gooseneck trailer, in the bed of the towing vehicle, in a tool box carried on either the gooseneck trailer or the towing vehicle, behind or underneath a seat of the towing vehicle. Though arm 11 of tool 10 is shown as a single piece, arm 11 may be jointed along curve 24 such that tool 10 may be further collapsed for storage.

Figure 3:
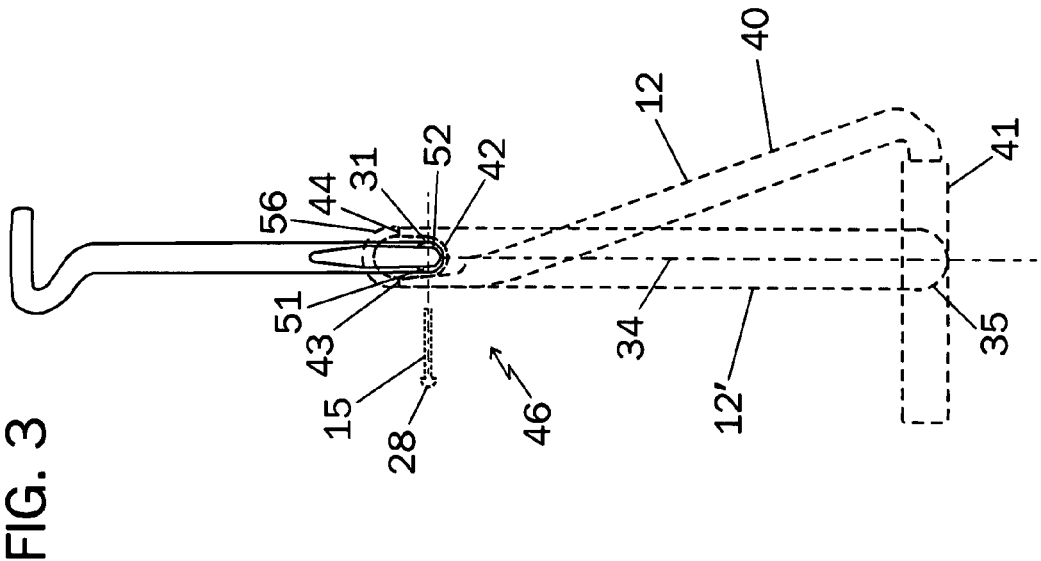
FIG. 3 is an end plan view of alternate embodiments of a support leg for a tool for unlocking a locking pin on a gooseneck ball hitch, the various embodiments shown in dashed and/or dotted lines.

An alternate embodiment for tool 10 adapted for unlatching a locking pin 103 on a gooseneck ball hitch 10 comprises arm 11 received in and supported in a saddle 42 on proximal end 26 of support leg 12, saddle 42 shown in long dashed lines in FIG. 3. Saddle 42 may be disposed on straight support leg 12' or on proximal end 26 of offset portion 40, offset portion 40 and lateral portion 41 shown in dashed lines in FIG. 3. Saddle 42 preferably has journal holes disposed through opposed sides 43, 44 of saddle 42, journal holes in opposed sides 43, 44 receiving journal pin 15 therethrough. As in the preferred embodiment, journal pin 15 has head 28 bearing against one side 43 and has a closure portion formed on an end 29 opposite head 28, closure portion 30 bearing against an opposed side 44. Arm 11 is thus journaled on journal pin 15 passing through opposed sides 43, 44 of saddle 42 and arm 11 and is secured in journal holes. Closure portion 30 may comprise a mushroomed head, nut, weldment, cotter pin, upset end or other closures as are well known in the art on end 29.

In yet another embodiment, tool 10 for unlatching a locking pin 103 on a gooseneck ball hitch 100 comprises arm 11 rigidly affixed to support leg 12, support leg 12 and arm 11 moving as an integral unit when unlocking locking pin 103. Support leg 12 may be permanently affixed to arm 11 approximately two-thirds of the distance from intersection point 25, however, lateral portion 41 will need to roll upon support surface 150 and thus anti-slippage surface 36 is replaced with a roller 45 journaled on lateral portion 41. Thus, locking pin 103 may be lifted with protuberance 17 on arm 11 and then arm 11 translated longitudinally toward column 113 by rolling roller 45 upon support surface 150. It is additionally possible to construct arm 11 with curve 24 extending substantially from handle end 16 to locking pin engagement end 18 such that a peripheral portion 47 of curve 24 contacts support surface 150 thus eliminating the need for support leg 12. In this embodiment, tool 10 rocks upon support surface 150 to lift locking pin 103 from engagement in hole 106 and peripheral portion 47 is then translated along support surface 150 by sliding tool 10 toward column 113. Still another embodiment is possible by providing a sleeve 56, shown in dot-dash lines surrounding arm 11, sleeve 56 disposed on proximal end 26 of support leg 12. It should be readily apparent that arm 11 has limited movement within plane 32 but may be rotated fully about axis 48 and moved longitudinally through sleeve 56 from handle end 16 to locking pin engagement end 18.

It is also within the scope of this invention to support arm 11 upon support leg 12 in a flexible joint 46 such as a ball in a socket or gimbal thus allowing greater flexibility in at least two degrees of movement. In the preferred embodiment, arm 11 can readily be moved in plane 32, arm 11 also having limited movement to the right or left of plane 32 as journal pin 15 is fitted loosely in a hole through proximal end 26 of support leg 12. A ball in a socket allows arm 11 to be moved fully within plane 32 and/or laterally to plane 32. In a similar manner, by using a gimbal, arm 11 may be readily moved within plane 32, rotated about central axis 33 and/or moved laterally to plane 32. In the embodiment shown in FIG. 3 wherein arm 11 is supported in saddle 42, arm 11 may be moved within plane 32 or rotated about axis 48 of locking pin engagement end 18 and additionally moved slightly transverse to plane 32 as arm 11 fits loosely within saddle 42. It should be readily apparent that limited movement in at least two degrees of freedom is possible with other configurations of flexible joint 46 as can be devised from the teachings of this invention.

Handle 14 of arm 11 may be fitted with a handle grip 49 to facilitate gripping of handle 14 when operating tool 10. Handle grip 49 may be a simple rubber sleeve installed over an open end 50 of handle 14 or handle 14 may be knurled or splined. Preferably, handle 14 is in a plane perpendicular to plane 32 of arm 11 though handle 14 may be disposed in line with plane 32 of arm 11 or at any orientation with respect to locking pin engagement end 18 as is comfortable for the operator of tool 10. Handle 14 may also be substantially closed by continuing end 50 in a curve inwardly toward arm 11 wherein end 50 butts against outside surface 23 of arm 11. In fact, end 50 may be welded to outside surface 23 of arm 11, thus fully closing handle 14.

Tool 10 is preferably made from five-eighths inch diameter steel rod stock approximately four and one-half feet in length. Arm 11 is cut from the steel rod stock approximately 36 inches in length and bent into curve 24 about intersection point 25 establishing handle end 16 and locking pin engagement end 18. Locking pin engagement end 18 is approximately sixteen inches from intersection point 25, handle end 16 comprising the remainder of arm 11. Handle 14 is formed upon handle end 16 by heating and bending the steel rod stock into the desired shape, the preferred shape shown in FIGS. 1 and 2, however, as hereinbefore mentioned, handle 14 may alternately be formed in a plane transverse to plane 32 or at any angle to plane 32 as desired. Protuberance 17 may be formed by heating locking pin engagement end 18 and forging protuberance 17 therefrom though protuberance 17 is preferably a three-eighths inch diameter steel rod formed into a semicircle having point 20 forged on one end, flattened on both sides with and the opposite end 52 welded to terminus 51 of locking pin engagement end 18. Protuberance 17 is preferably formed flat along at least a portion of the length thereof to allow protuberance 17 to be inserted into slot 112 to move base plate 108 when uncoupling column 113 from the ball. Spaced inwardly about four inches from terminus 51 of locking pin engagement end 18 is at least one journal plate 21. Preferably two journal plates 21 are welded to sides 22, 23 of arm 11 in opposed relationship, journal plates 21 each about one inch wide and one and one-half inches in length. Journal plates 21 each have a journal pin hole 54 formed therethrough, journal pin holes 54 receiving journal pin 15 therein. Support leg 12 is formed from the remainder of the five-eighths inch diameter steel rod stock and thus has a developed length of about 18 inches. Proximal end 26 is flattened for a portion 55 thereof, flattened portion 55 having a journal pin hole 53 disposed therethrough, flattened portion 55 cooperating with journal plates 21 to comprise flexible joint 46. Adjacent flattened portion 55, offset 40 is formed by bending offset portion 40 about fifteen degrees from flattened portion 55. Offset portion 40 is approximately nine inches in length and terminates in foot 13, foot 13 extending inwardly at an acute angle from offset portion 40. Foot 13 may be provided with an anti-slippage surface 36, anti-slippage surface 36 generally comprising a short length of rubber tubing or hose. Support leg 12 is then assembled to arm 11 by aligning journal pin holes 54 of journal plates 21 with journal pin hole 53 of flattened portion 55 of support leg 12, passing journal pin 15 therethrough and providing closure portion 30 on end 29 of journal pin 15 thus rotatably affixing support leg 12 to arm 11. As journal plates 21 are spaced apart a distance greater than the thickness of flattened end 55, arm 11 is movable relative to support leg 12 readily in plane 32 and to a limited degree transverse to plane 32 such that locking pin 103 may be lifted free of hole 106 and then moved toward column 113 to rest locking pin 103 on post 114. The construction of the various embodiments described herein may readily be accomplished by those skilled in the metal working arts. Though tool 10 is preferably primarily manufactured from five-eighths diameter steel rod, it is fully within the scope of this invention to produce tool 10 of other materials and other methods.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor the invention limited thereto.

I claim:

1. An universal tool for unlatching a locking pin on a gooseneck ball hitch comprises an arm supported on a support leg, said arm having a handle end and a locking pin engagement end, said arm provided with a curve disposed between said handle end and said locking pin engagement end, said locking pin engagement end disposed opposite said handle end, said locking pin engagement end terminating in a curved hook, said hook, said arm and said curve disposed in a plane passing through a central axis of said arm, said handle bent ninety degrees from said plane, said arm provided with a journal plate disposed on at least one side thereof between said curve and said locking pin engagement end, said support leg having a proximal end and a distal end, said proximal end of said support leg journaled on said journal plate, said support leg provided with a foot on said distal end wherein said plane passing through said central axis of said arm is substantially centrally disposed over said foot and wherein said foot is disposed lateral to an offset portion of said support leg and at a right angle to said plane, said foot adapted to be engaged upon a support surface proximate said locking pin, said hook adapted to be engaged with said locking pin, move said locking pin to an unlocked position and release said locking pin onto a resting post.

2. A tool as in claim 1 wherein said curved hook is adapted to engage a closed loop of said locking pin.

3. A tool for unlatching a locking pin on a gooseneck ball hitch comprises an arm received in and supported in a saddle on a proximal end of a support leg, said arm having a handle end disposed opposite a locking pin engagement end, said arm provided with a curve disposed between said handle end and said locking pin engagement end, said saddle disposed between said curve and said locking pin engagement end, said locking pin engagement end terminating in a curved hook, said hook, said arm and said curve disposed in a plane passing through a central axis of said arm, said handle bent ninety degrees from said plane, said support leg having said proximal end opposite a distal end, said support leg provided with a foot on said distal end wherein said plane passing through said central axis of said arm is substantially centrally disposed over said foot, said foot adapted to be engaged upon a support surface proximate said locking pin, said hook adapted to be engaged with said locking pin, move said locking pin to an unlocked position and release said locking pin onto a resting post.

4. A tool as in claim 3 wherein said saddle has journal holes disposed through opposed sides of said saddle.

5. A tool as in claim 4 wherein said arm is journaled on a journal pin passing through and secured in said journal holes.

6. A tool as in claim 5 wherein said support leg has said saddle located substantially centrally over said foot said foot disposed lateral to an offset portion of said support leg.

7. A tool as in claim 6 wherein said foot has an anti-slippage surface on at least a portion of the exterior surface thereof.

8. A tool for unlatching a locking pin on a gooseneck ball hitch comprises an arm rigidly affixed to a support leg, said arm having a handle end disposed opposite a locking pin engagement end, said arm provided with a curve disposed between said handle end and said locking pin engagement end, said locking pin engagement end terminating in a curved hook, said hook, said arm and said curve disposed in a plane passing through a central axis of said arm, said handle bent ninety degrees from said plane, said support leg having a proximal end and a distal end, said proximal end of said support leg fixed to said arm between said curve and said locking pin engagement end, said support leg provided with a foot on said distal end wherein said plane passing through said central axis of said arm is substantially centrally disposed over said foot, said foot adapted to be engaged upon a support surface proximate said locking pin, said hook adapted to be engaged with said locking pin, move said locking pin to an unlocked position and release said locking pin onto a resting post.

* * * * *